United States Patent
Park et al.

(10) Patent No.: US 11,160,051 B2
(45) Date of Patent: Oct. 26, 2021

(54) METHOD FOR TRANSMITTING OR RECEIVING DOWNLINK CONTROL CHANNEL IN NEXT GENERATION WIRELESS NETWORK AND APPARATUS THEREFOR

(71) Applicant: KT CORPORATION, Gyeonggi-do (KR)

(72) Inventors: Kyujin Park, Seoul (KR); Woo-Jin Choi, Seoul (KR)

(73) Assignee: KT CORPORATION, Seongnam-si (KR)

( * ) Notice: Subject to any disclaimer, the term of this patent is extended or adjusted under 35 U.S.C. 154(b) by 0 days.

(21) Appl. No.: 16/464,135

(22) PCT Filed: Jan. 5, 2018

(86) PCT No.: PCT/KR2018/000221
§ 371 (c)(1),
(2) Date: May 24, 2019

(87) PCT Pub. No.: WO2018/128440
PCT Pub. Date: Jul. 12, 2018

(65) Prior Publication Data
US 2019/0394751 A1  Dec. 26, 2019

(30) Foreign Application Priority Data

Jan. 6, 2017 (KR) .................. 10-2017-0002589
May 30, 2017 (KR) .................. 10-2017-0066632
Jan. 4, 2018 (KR) .................. 10-2018-0001157

(51) Int. Cl.
*H04W 72/00* (2009.01)
*H04W 72/04* (2009.01)
*H04L 5/00* (2006.01)

(52) U.S. Cl.
CPC ......... *H04W 72/005* (2013.01); *H04L 5/0094* (2013.01); *H04W 72/042* (2013.01); *H04W 72/0446* (2013.01); *H04W 72/0453* (2013.01)

(58) Field of Classification Search
CPC ............. H04W 72/005; H04W 72/042; H04W 72/0446; H04W 72/0453; H04L 5/0094
See application file for complete search history.

(56) References Cited

U.S. PATENT DOCUMENTS

2011/0194501 A1\* 8/2011 Chung .................... H04W 4/00
2013/0301549 A1\* 11/2013 Chen ...................... H04B 7/024
(Continued)

OTHER PUBLICATIONS

Zte et al., "Issues Related to NR-PBCH", R1-1611443, 3GPP TSG RAN WG1 Meeting #87, Reno, USA, Nov. 14-18, 2016, pp. 1-3.
(Continued)

*Primary Examiner* — Ronald B Abelson
(74) *Attorney, Agent, or Firm* — Invenstone Patent, LLC (57) ABSTRACT

Provided are a method and an apparatus for transmitting or receiving a downlink control channel in a next generation/ 5G wireless access network. The method includes receiving configuration information relating to a common search space (CSS) from a base station and receiving, through the common search space, a downlink control channel including information for scheduling remaining minimum system information (RMSI), wherein the configuration information is included in a master information block (MIB) received through a physical broadcast channel and is received from the base station.

12 Claims, 6 Drawing Sheets

(56) References Cited

U.S. PATENT DOCUMENTS

| | | | |
|---|---|---|---|
| 2014/0133331 A1* | 5/2014 | Fu | H04W 24/08 |
| 2014/0177556 A1* | 6/2014 | Pan | H04L 1/0038 |
| 2015/0230210 A1* | 8/2015 | Lee | H04L 5/0007 |
| 2015/0237604 A1* | 8/2015 | Shi | H04W 72/04 |
| 2016/0043849 A1 | 2/2016 | Lee et al. | |
| 2017/0201968 A1* | 7/2017 | Nam | H04W 72/04 |
| 2017/0295110 A1* | 10/2017 | Kato | H04L 5/0007 |
| 2019/0174437 A1* | 6/2019 | Lyu | H04L 5/0048 |
| 2019/0349904 A1* | 11/2019 | Kwak | H04W 72/04 |
| 2019/0356524 A1* | 11/2019 | Yi | H04L 5/0094 |
| 2020/0022148 A1* | 1/2020 | Tang | H04W 72/0493 |

OTHER PUBLICATIONS

QUALCOMM Incorporated, "Scaled Numerology Control Design for NR", R1-1612019, 3GPP TSG-RAN WG1 #87, Reno, USA, Nov. 14-18, 2016, pp. 1-10.

Ericsson, "Content and distribution of minimum SI", R2-168287, 3GPP TSG-RAN WG2 #96, Reno, Nevada, USA, Nov. 14-18, 2016, pp. 1-6.

Nokia et al., "Distribution of System Information in NR", R2-168690, 3GPP TSG-RAN WG2 Meeting #96, Reno, USA, Nov. 14-18, 2016, pp. 1-5.

Nokia et al., "On Remaining System Information Delivery", R1-1705841, 3GPP TSG-RAN WG1 Meeting #88bis, Spokane, WA, USA, Apr. 3-7, 2017.

Samsung, "Configuration and Functionalities of Common Search Space", R1-1707998, 3GPP TSG RAN WG1 #89, Hangzhou, China, May 15-19, 2017, pp. 1-2.

Samsung, "Remaining system information delivery", R1-1707930, 3GPP TSG RAN WG1 meeting #89, Hangzhou, P.R. China, May 15-19, 2017.

European Patent Office, Extended European Search Report of corresponding EP Patent Application No. 18736364.3, dated May 28, 2020.

* cited by examiner

METHOD FOR TRANSMITTING OR RECEIVING DOWNLINK CONTROL CHANNEL IN NEXT GENERATION WIRELESS NETWORK AND APPARATUS THEREFOR

CROSS REFERENCE TO RELATED APPLICATIONS

This application is a National Stage Patent Application of PCT International Patent Application No. PCT/KR2018/000221 (filed on Jan. 5, 2018) under 35 U.S.C. § 371, which claims priority to Korean Patent Application Nos. 10-2017-0002589 (filed on Jan. 6, 2017), 10-2017-0066632 (filed on May 30, 2017) and 10-2018-0001157 (filed on Jan. 4, 2018), the teachings of which are incorporated herein in their entireties by reference.

TECHNICAL FIELD

The present disclosure relates to methods and apparatuses for transmitting/receiving a downlink control channel in a next-generation/5G radio access network (hereinafter, referred to as "new radio" or "NR") that is under discussion in the 3rd generation partnership project (3GPP). More specifically, the present disclosure relates to methods for configuring a common search space (CSS) to transmit cell-specific downlink control information (DCI) to a user equipment through a downlink control channel, and transmitting/receiving the downlink control channel through the configured CSS.

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

An enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

In the NR having such various usage scenarios, it is required to configure a resource of a downlink control channel in order to transmit/receive scheduling control information based on time/frequency resources different from one another for each user equipment.

In particular, it is necessary to define methods for configuring time and frequency resources for a common search space (CSS) used for transmitting cell-specific downlink control information (DCI) through a downlink control channel. In addition, it is necessary to define methods for configuring a numerology of a downlink control channel including information for scheduling remaining minimum system information (RMSI) transmitted through the common search space.

DETAILED DESCRIPTION OF THE INVENTION

Technical Problem

It is an object of the present disclosure to provide methods of transmitting/receiving a downlink control channel used for transmitting/receiving scheduling control information based on time/frequency resources different from one another for each user equipment, in the NR having such various usage scenarios.

Technical Solution

In accordance with an aspect the present disclosure to address of such issues, methods of a user equipment is provided for receiving a downlink control channel (PDCCH). The methods includes: receiving configuration information on a common search space (CSS) from a base station, and receiving the downlink control channel (PDCCH) including information for scheduling remaining minimum system information (RMSI) through the common search space. Wherein the configuration information is included in a master information block (MIB) received from the base station through a physical broadcast channel (PBCH).

In accordance with another aspect of the present disclosure, a method of a base station is provided for transmitting a downlink control channel (PDCCH). The methods includes: configuring configuration information on a common search space (CSS), transmitting the configuration information to a user equipment, and transmitting the downlink control channel (PDCCH) including information for scheduling remaining minimum system information (RMSI) through the common search space. Wherein the configuration information is included in a master information block (MIB) transmitted to the user equipment through a physical broadcast channel (PBCH).

In accordance with still another aspect of the present disclosure, a user equipment is provided for receiving a downlink control channel (PDCCH). The user equipment includes a receiver configured to receive configuration information on a common search space (CSS) from a base station, and receive the downlink control channel (PDCCH) including information for scheduling remaining minimum system information (RMSI) through the common search space. Wherein the configuration information on the common search space is included in a master information block (MIB) received from the base station through a physical broadcast channel (PBCH).

In accordance with yet another aspect of the present disclosure, a base station is provided for transmitting a downlink control channel (PDCCH). The base station includes a controller configured to configure configuration information on a common search space (CSS), and a transmitter configured to transmit the configuration information to a user equipment, and transmit the downlink control channel (PDCCH) including information for scheduling remaining minimum system information (RMSI) through the common search space. Wherein the configuration information on the common search space is included in a master information block (MIB) transmitted to the user equipment through a physical broadcast channel (PBCH).

Effects of the Invention

In accordance with some embodiments of the present disclosure, it is possible to transmit and receive a downlink control channel used to transmit/receive scheduling control information based on time/frequency resources each different from another for each user equipment, in the NR having various usage scenarios.

BRIEF DESCRIPTION OF THE DRAWINGS

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, a wireless communication system refers to a system for providing various communication services such as a voice communication service, a packet data service, etc. The wireless communication system includes user equipment (UE) and a base station (BS).

The UE is a generic term referring to devices used in wireless communication. For example, the UE may be referred to, but not limited to, a UE supporting wideband code division multiple access (WCDMA), long term evolution (LTE), high speed packet access (HSPA), international mobile telecommunications (IMT)-2020 (5G or new radio), or the like, a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

Each of the various cells is controlled by a base station. Therefore, the base station may be classified into two categories. 1) The base station may be referred to an apparatus that forms a communication service area and provides a communication service within the corresponding communication service area, such as a megacell, a macrocell, a microcell, a picocell, a femtocell, and a small cell, or 2) the base station may be referred to a communication service area itself. In the case of 1), the base station may be referred to i) apparatuses that are controlled by the same entity for forming a communication service area and providing a communication service with the communication service area, or ii) apparatus that interact and cooperate with each other for forming a communication service area and providing a communication service within the corresponding communication service area. According to communication schemes employed by a base station, the base station may be referred to as a point, a transmission/reception point, a transmission point, a reception point, or the like. In case of 2), the base station may be a communication service area itself where UEs able to receive signals from or transmit signals to other UEs and neighboring base stations.

In the present disclosure, the cell may also refer to a coverage of a signal transmitted from a transmission/reception point, a component carrier having the coverage of a signal transmitted from a transmission point or a transmission/reception point, or a transmission/reception point itself.

The UE and the base station are two entities for performing transmission/reception used to embody the technology and technical spirit described in the present specification. The UE and the BS are a generic term and not limited to specific terms or words.

Herein, the uplink (UL) refers to data transmission/reception by a UE to/from a base station, and the downlink (DL) refers to data transmission/reception by a base station to/from a UE.

UL transmission and DL transmission may be performed by employing i) a time division duplex (TDD) technique performing transmission through different time slots, ii) a frequency division duplex (FDD) technique performing transmission through different frequencies, or iii) a hybrid technique of the frequency division duplex (FDD) and the time division duplex (TDD).

Further, the related standard of the wireless communication system defines configuring the UL and the DL based on a single carrier or a pair of carriers.

The UL and the DL transmit control information through one or more control channels, such as a physical DL control channel (PDCCH), a physical UL control channel (PUCCH), and the like. The UL and DL transmit data through data channels, such as a physical DL shared channel (PDSCH), a physical UL shared channel (PUSCH), and the like.

The DL may denote communication or a communication path from multiple transmission/reception points to a UE, and the UL may denote communication or a communication path from the UE to the multiple transmission/reception points. In the DL, a transmitter may be a part of multiple transmission/reception points, and a receiver may be a part of a UE. In the UL, a transmitter may be a part of a UE and a receiver may be a part of multiple transmission/reception points.

Hereinafter, transmission and reception of a signal through a channel such as the PUCCH, the PUSCH, the PDCCH, or the PDSCH, may be described as the transmission and reception of the channel, such as the PUCCH, the PUSCH, the PDCCH, or the PDSCH.

Meanwhile, higher layer signaling includes radio resource control (RRC) signaling transmitting RRC information including an RRC parameter.

The base station performs DL transmission to UEs. The base station may transmit a physical DL control channel for transmitting i) DL control information, such as scheduling required to receive a DL data channel that is a primary physical channel for unicast transmission, and ii) scheduling approval information for transmission through an UL data channel. Hereinafter, transmitting/receiving a signal through each channel may be described in such a manner that a corresponding channel is transmitted/received.

Any of multiple access techniques may be applied to the wireless communication system, and therefore no limitation is imposed on them. For example, the wireless communication system may employ various multiple access techniques, such as time division multiple access (TDMA), frequency division multiple access (FDMA), CDMA, orthogonal frequency division multiple access (OFDMA), non-orthogonal multiple access (NOMA), OFDM-TDMA, OFDM-FDMA, OFDM-CDMA, or the like. The NOMA includes sparse code multiple access (SCMA), low cost spreading (LDS), and the like.

At least one embodiment of the present disclosure may be applied to resource allocation in i) asynchronous wireless communication evolving into LTE/LTE-advanced and IMT-2020 from GSM, WCDMA, and HSPA, or ii) synchronous wireless communication evolving into CDMA, CDMA-2000, and UMB.

In the present disclosure, a machine type communication (MTC) terminal may refer to a terminal supporting low costs (or low complexity), a terminal supporting coverage enhancement, or the like. As another example, the MTC terminal may refer to a terminal defined as a predetermined category for supporting low cost (or low complexity) and/or coverage enhancement.

In other words, the MTC terminal may refer to a low cost (or low complexity) UE category/type newly defined in 3GPP Release-13 and performing LTE-based MTC-related operations. The MTC device of the present disclosure may refer to a device category/type that is defined in or before 3GPP Release-12 that supports enhanced coverage in comparison with the existing LTE coverage or supports low power consumption, or may refer to a low cost (or low complexity) device category/type newly defined in Release-13. The MTC terminal may refer to a further enhanced MTC terminal defined in Release-14.

In the present disclosure, a narrowband Internet of Things (NB-IoT) terminal refers to a terminal supporting radio access for cellular IoT. NB-IoT technology aims at improved indoor coverage, support for large-scale low-speed terminals, low latency sensitivity, very low terminal costs, low power consumption, and optimized network architecture.

An enhanced mobile broadband (eMBB), massive machine-type communication (mMTC), and ultra reliable and low latency communication (URLLC) are proposed as representative usage scenarios for NR having been discussed in the 3GPP recently.

In the present disclosure, a frequency, a frame, a sub-frame, a resource, a resource block (RB), a region, a band, a sub-band, a control channel, a data channel, a synchronization signal, various reference signals, various signals, and various messages, associated with NR may be interpreted as meanings that were used in the past or are used in the present or as various meanings that will be used in the future.

NR (New Radio)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access methods, and the like for the new radio (NR).

It is required to design the NR not only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have a flexible frame structure compared with the LTE/LTE-Advanced.

Specifically, the eMBB, mMTC, URLLC are considered as representative usage scenarios of the NR by the 3GPP. Since each usage scenario imposes different requirements for data rates, latency, coverage, etc., there arises a need for a method of efficiently multiplexing numerology-based (e.g., a subcarrier spacing (SCS), a subframe, a transmission time interval (TTI), etc.) radio resource units different from each other, as a solution for efficiently satisfying requirements according to usage scenarios through a frequency band provided to an arbitrary NR system.

To this end, there have been discussions on i) methods of multiplexing numerologies each having different subcarrier spacing (SCS) values from another based on TDM, FDM or TDM/FDM technique through one NR carrier, and ii) methods of supporting one or more time units in configuring a scheduling unit in the time domain. In this regard, in the NR, a definition of a subframe has been given as one type of a time domain structure. In addition, as a reference numerology to define a corresponding subframe duration, a single subframe duration is defined as having 14 OFDM symbols of normal CP overhead based on 15 kHz subcarrier spacing (SCS), like the LTE. Therefore, the subframe of the NR has the time duration of 1 ms. Unlike the LTE, since the subframe of the NR is an absolute reference time duration, a slot and a mini-slot may be defined as a time unit used as a basis of actual UL/DL data scheduling. In this case, the number of OFDM symbols forming a slot, a value of y, has been defined as y=14 regardless of a numerology.

Therefore, a slot may be formed of 14 symbols. In accordance with transmission direction for a corresponding slot, all symbols may be used for DL transmission or UL transmission, or the symbols may be used in the configuration of a DL portion+a gap+a UL portion.

Further, a mini-slot formed of fewer symbols than the slot has been defined in a numerology (or SCS), and as a result, a short time domain scheduling interval may be set for UL/DL data transmission or reception based on the mini-slot. Also, a long time domain scheduling interval may be set for the UL/DL data transmission or reception by slot aggregation.

Particularly, in the case of the transmission or reception of latency critical data, such as the URLLC, when scheduling is performed based on a unit of a slot based on 0.5 ms (7 symbols) or 1 ms (14 symbols) defined in a frame structure based on a numerology having a small SCS value, for example, 15 kHz, it may be difficult to satisfy latency requirements. To this end, a mini-slot formed of fewer OFDM symbols than the slot may be defined, and thus the scheduling for the latency critical data, such as the URLLC, may be performed based on the mini-slot.

Figure 1:
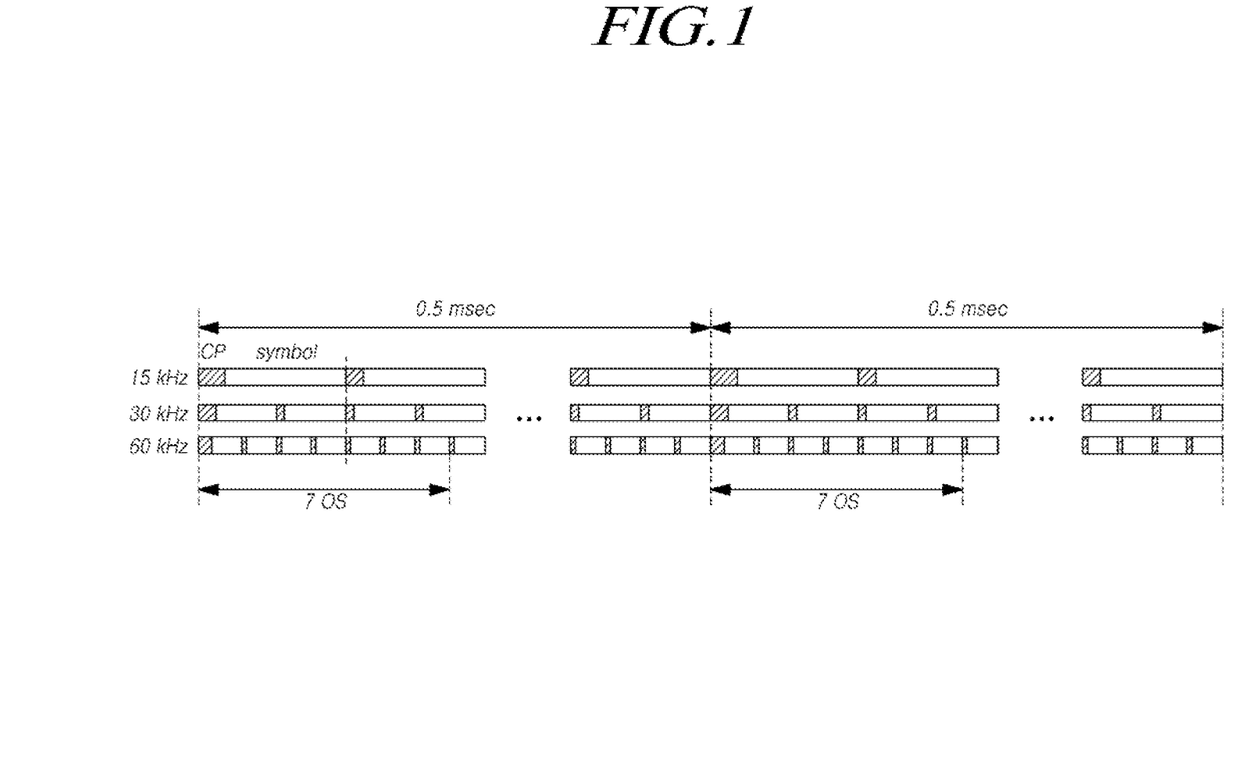
FIG. 1 is a diagram illustrating arrangements of orthogonal frequency division multiple (OFDM) symbols in case subcarrier spacings different from one another are used.

Further, methods have been discussed for scheduling data according to latency requirements based on a slot (or a mini-slot) length defined for each numerology, by multiplexing numerologies each having different SCS values from another in one NR carrier, using the TDM or FDM technique, as described above. For example, as shown in FIG. 1, in the case of the SCS of 60 kHz, since the length of a symbol is shortened by about a fourth of that for the SCS of 15 kHz, when one slot is formed of seven OFDM symbols in both the cases, the length of the slot based on the SCS of 15 kHz is 0.5 ms, whereas the length of the slot based on the SCS of 60 kHz is shortened to about 0.125 ms.

In this regard, discussion on methods for satisfying each requirement of URLLC and eMBB is in progress by defining different SCSs or different TTI lengths in the NR.

Wider Bandwidth Operations

A typical LTE system supports scalable bandwidth operations for an LTE component carrier (CC). That is, when configuring one LTE CC according to frequency deployment scenarios, an LTE service provider can configure the LTE CC with a bandwidth divided from the frequency range from 1.4 MHz to 20 MHz. Thus, an LTE UE has transmission/reception capabilities for supporting a bandwidth of 20 MHz for one LTE CC.

Figure 2:
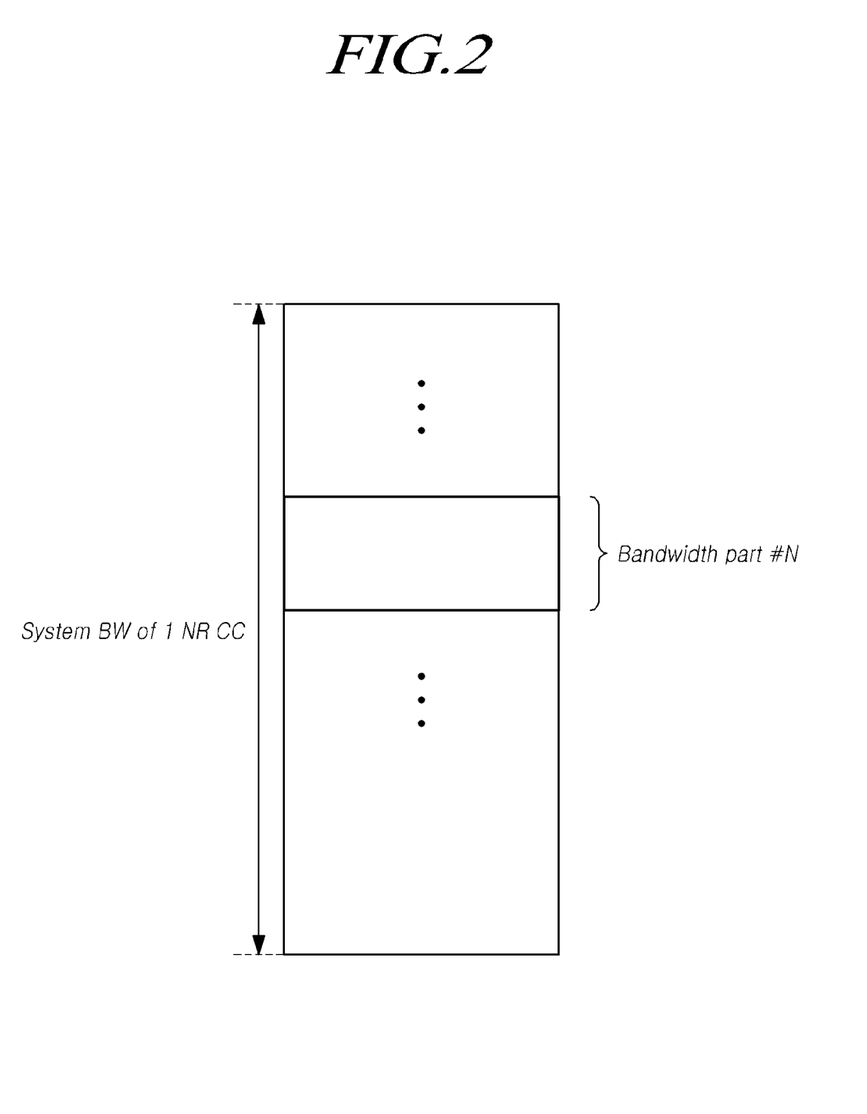
FIG. 2 is a diagram illustrating a conceptual example of a bandwidth part (BWP).

However, the NR is designed to support an NR UE having transmission/reception capabilities for different bandwidths from one another in one NR CC. To this end, as shown in FIG. 2, it is possible to configure one or more bandwidth parts (BWPs) divided from an NR CC. In addition, it is required to support flexible wider bandwidth operations for enabling different bandwidth parts from one another to be configured and activated for each UE.

Referring to FIG. 2, n bandwidth parts may be defined by dividing the entire bandwidth of one NR CC into one or more parts, and each UE may activate and use one or more bandwidth parts of the N bandwidth parts.

Thus, an NR CC may be divided into one or more bandwidth parts. Accordingly, each UE may be configured with one or more bandwidth parts. It is possible to activate one or more bandwidth parts of bandwidth parts configured for a UE and transmit/receive an UL/DL radio signal and a radio channel for the UE using the activated bandwidth part(s).

In addition, in case a plurality of numerologies is supported in an NR CC, different numerologies from one another may be configured for each bandwidth part for transmitting/receiving an UL/DL radio signal and a radio channel.

As described above, in order to support URLLC services in the NR, it is necessary to support a short scheduling unit (or, TTI (transmission time interval)) capable of satisfying latency boundary in the time domain. On the contrary, in the case of the eMBB or the mMTC, to define scheduling unit in the time domain, it may be more effective to use a slightly longer time-interval resource allocation unit compared with that of the URLLC in terms of control overhead and coverage.

Thus, as methods for simultaneously satisfying various NR usage scenarios, a mixed numerology technique may be employed for supporting, through one NR carrier, both a numerology of subcarrier spacing (e.g., larger subcarrier spacing, such as 60 kHz, 120 kHz, etc.) that is easy to define a short time-interval resource allocation unit suitable for the URLLC and a numerology of subcarrier spacing (e.g., 15 kHz for eMBB or 3.75 kHZ for mMTC) suitable for the eMBB and the mMTC.

As another example, it is possible to support simultaneously time-domain scheduling units each having different lengths from another, such as a subframe, a slot or mini-slot, or the like, in an NR carrier operated with a specific numerology.

In accordance with embodiments of the present disclosure, in the NR taking such various usage scenarios into account, a method may be provided for configuring a resource of a DL control channel for transmitting/receiving scheduling control information based on different time-domain scheduling units from one another for each UE, and for monitoring the DL control channel by a UE.

In particular, a method is provided for configuring a common search space (CSS) used to transmit cell-specific DL control information (DCI) through a DL control channel.

It is noted that methods of configuring the CSS according to embodiments of the present disclosure may be interpreted as methods of configuring a control resource set (CORESET) in which the CSS is configured.

In addition, cell-specific DCI included in a PDCCH transmitted through a CSS configured in a CORESET may include i) scheduling control information on remaining minimum system information (RMSI), ii) cell-specific transmit power control (TPC) related configuration information, iii) scheduling control information on a paging message, iv) scheduling control information on a random access response (RAR).

Hereinafter, for convenience of description and ease of understanding, a method related to a CSS configuration is discussed, but this method may be interpreted as a method of configuring a CORESET.

Embodiments described below may be applied to all UEs, base stations, and core network entities (MME) using various mobile communication technologies. For example, embodiments of the present disclosure may be applied not only to mobile communication UEs employing long term evolution technology, but also to next generation mobile communication (5G mobile communication, New-RAT) UEs, base stations, and access and mobility functions (AMF). For convenience of description, a base station may denote an eNB of LTE/E-UTRAN, or denote at least one of a central unit (CU), a distribute unit (DU), and an object in which the CU and the DU are implemented as one logical object, or a gNB, in a 5G radio network in which the CU is separated from the DU.

In addition, the numerology in the present disclosure denotes numerical characteristics and numerical values for data transmission/reception. The numerology may be determined depending on a value of the subcarrier spacing (hereinafter, referred to as SCS or subcarrier spacing). That is, a subcarrier spacing may be used for determining whether each numerology is different from another, and therefore different numerologies may mean that subcarrier spacings determining the numerologies are different.

The slot length in the present disclosure may be expressed as the number of OFDM symbols forming a slot or as a time occupied by the slot. For example, in case a numerology based on 15 kHz SCS is used, the length of one symbol may be expressed as 14 orthogonal frequency division multiple symbols, or expressed as 1 ms.

In addition, remaining minimum system information (RMSI) is a part of system information, namely a system information block (SIB)1, and may be transmitted to a UE. Therefore, the remaining minimum system information may be referred to as SIB1. System information transmitted to a UE through a SIB other than the SIB1 may be referred to as other system information (OSI).

Figure 3:
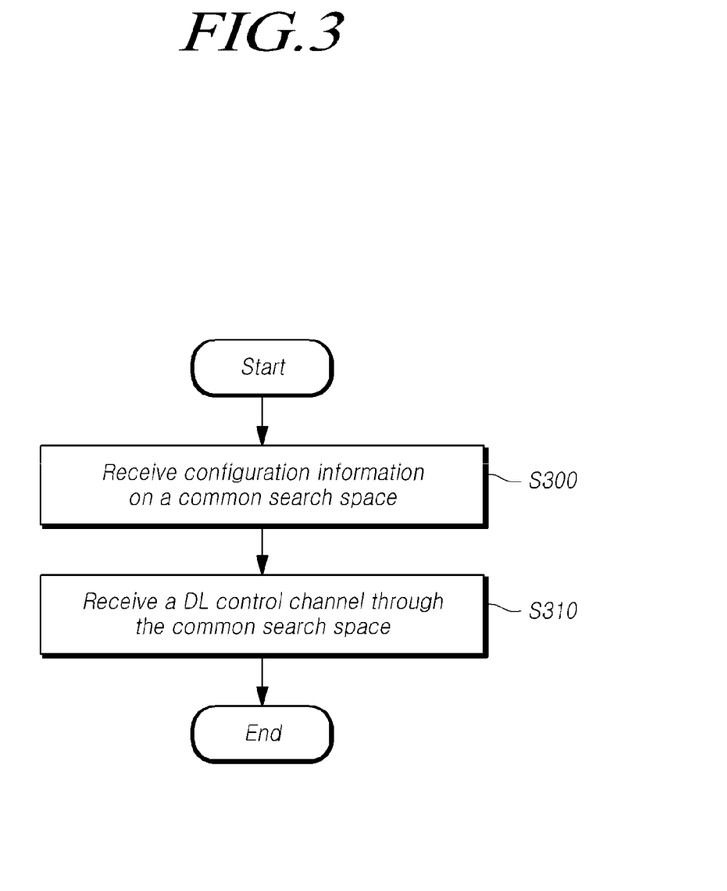
FIG. 3 is a flowchart illustrating a procedure of a user equipment for receiving a downlink control channel, according to embodiments of the present disclosure.

FIG. 3 is a flowchart illustrating a procedure of a UE for receiving a DL control channel, according to embodiments of the present disclosure.

Referring to FIG. 3, a UE may receive configuration information on a common search space (CSS) from a base station at step S300.

At this time, the configuration information on the common search space may be included in a master information block (MIB) received through a physical broadcast channel (PBCH). That is, the base station may broadcast the master information block to UEs located in the cell through the PBCH. At this time, the base station may include the configuration information on the common search space in the master information block.

An example of information included in such configuration information may be subcarrier spacing (SCS) information on a DL control channel transmitted to a UE through the common search space.

As described above, a plurality of numerologies may be configured in an NR CC/cell, and numerologies used for transmitting a PDCCH may differ. Accordingly, numerology configuration information on the PDCCH may be included in the configuration information on the common search space. As described above, the numerology may differ depending on a subcarrier spacing value, and therefore subcarrier spacing information may be included in the configuration information on the common search space.

Another example of information included in such configuration information may be time resource assignment information and frequency resource assignment information on the common search space.

At this time, the time resource assignment information may be information on a period of the common search space. The period may be defined as i) a fixed value regardless of a subcarrier spacing value or a slot length, or ii) a function of a subcarrier spacing value, or may be set by a subcarrier spacing value and a slot length used for transmitting a PSS/SSS or a PBCH.

At this time, a frequency resource may be assigned with one or more consecutive physical resource blocks (PRB) based on the frequency resource assignment information. That is, the frequency resource assignment information may include information on a group of consecutive PRBs forming a common search space.

In addition, the UE may receive a DL control channel (PDCCH) including information for scheduling remaining minimum system information (RMSI) through the common search space at step S310.

The UE may receive the DL control channel through the common search space based on the configuration information on the common search space received in the step S300.

The DL control channel received through the common search space may include cell-specific DCI common to all UEs located in the cell. At this time, an example of information included in the cell-specific DCI may be information for scheduling remaining minimum system information (RMSI), that is, control information on the RMSI.

Figure 4:
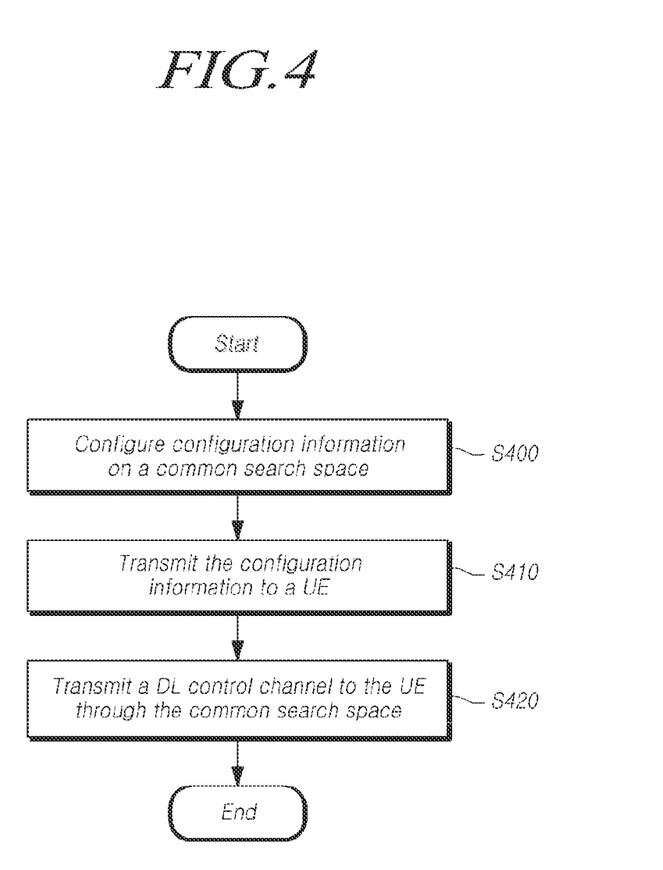
FIG. 4 is a flowchart illustrating a procedure of a base station for transmitting a downlink control channel, according to embodiments of the present disclosure.

FIG. 4 is a flowchart illustrating a procedure of a base station for transmitting a DL control channel, according to embodiments of the present disclosure.

Referring to FIG. 4, the base station may configure configuration information on a common search space (CSS) at step S400.

An example of information included in such configuration information may be subcarrier spacing (SCS) information on a DL control channel transmitted to a UE through the common search space.

As described above, a plurality of numerologies may be configured in an NR CC/cell, and numerologies used for transmitting a PDCCH may differ. Accordingly, numerology configuration information on the PDCCH may be included in the configuration information on the common search space. As described above, the numerology may differ depending on a subcarrier spacing value. Therefore, subcarrier spacing information may be included in configuration information on common search space.

Another example of information included in such configuration information may be time resource assignment information and frequency resource assignment information on the common search space.

At this time, the time resource assignment information may be information on a period of the common search space. The period may be defined as i) a fixed value regardless of a subcarrier spacing value or a slot length, or ii) a function of a subcarrier spacing value, or may be set by a subcarrier spacing value and a slot length used for transmitting a PSS/SSS or a PBCH.

At this time, a frequency resource may be assigned with one or more consecutive physical resource blocks (PRB) based on the frequency resource assignment information. The frequency resource assignment information may include information on a group of consecutive PRBs forming a common search space.

In addition, the base station may transmit the configuration information on the common search space (CSS) to a UE at step S410.

At this time, the configuration information on the common search space may be included in a master information block (MIB) received through a physical broadcast channel (PBCH), as described above with reference to FIG. 3. That is, when broadcasting the master information block to UEs located in the cell through the PBCH, the base station may include the configuration information on the common search space in the master information block.

In addition, the base station may transmit a DL control channel (PDCCH) including information for scheduling remaining minimum system information (RMSI) through the common search space at step S420.

The base station may transmit the DL control channel through the common search space based on the configuration information on the common search space configured in the step S400.

The DL control channel received through the common search space may include cell-specific DCI common to all UEs located in the cell, as described above with reference to FIG. 3. At this time, an example of information included in the cell-specific DCI may be information for scheduling remaining minimum system information (RMSI), that is, control information on the RMSI.

Hereinafter, methods of the UE and the BS for configuring a DL control channel described above will be discussed in detail in accordance with various embodiments.

Some embodiments described below can be configured individually or in any combination.

Embodiment 1. CSS Period Setting

According to the Embodiment 1, a method may be provided for configuring a resource on time-domain axis for a CSS or a CORESET configured with the CSS. Specifically, configuration information on a time-interval resource for the CSS in an NR component carrier (CC)/cell may be information on a period for configuring the CSS.

As described above, in the NR, it is required to support a plurality of numerologies based on different SCSs from one another. Thus, in the NR, data scheduling may be performed based on a frame structure based on SCSs each different from another and corresponding slot lengths according to a frequency band or a usage scenario of an NR cell.

Like this, in the NR based on a plurality of numerologies, the period of the CSS may be set with a fixed period, regardless of SCS values and corresponding slot lengths. For example, in the NR, the CSS may be defined to be configured based on a unit of the subframe, that is, a unit of 1 ms.

As another example for setting the CSS period, the CSS period may be set as a function of a SCS value. That is, the CSS period may differ depending on a SCS value used in an NR cell. At this time, the CSS period may be defined as a function of a SCS value, or a function of a slot length set in an NR cell.

For example, the CSS may be configured based on a unit of a slot defined in a cell. In case a plurality of SCSs is supported in an NR cell, the CSS may be configured based on a SCS through which a PSS/SSS or a PBCH is transmitted and a corresponding slot length. As another example, one or more separate CSSs may be configured depending on each SCS and slot length.

As still another example, a base station or a network may set a period of the CSS and transmit the set period to a UE through cell-specific RRC signaling, such as a MIB or a SIB.

For example, configuration information related to the CSS period may be included in a MIB transmitted through a PBCH. The configuration information related to the CSS period may be i) period setting information based on a unit of a slot based on transmission numerology configuration of a CSS and a corresponding slot length, ii) period setting information based on a unit of a radio frame or a subframe, iii) information related to one or more slot indices or one or more subframe indices for configuring a CSS in a radio frame based on a unit of one or more radio frames.

Embodiment 2 CSS Sub-Band Configuration

According to the Embodiment 2, a method may be provided for configuring a resource on frequency-domain axis for a CSS or a CORESET configured with the CSS. Specifically, assignment information for a frequency interval resource for a CSS in an NR component carrier (CC)/cell may be sub-band related assignment information or bandwidth part related assignment information configured with a group of consecutive physical resource blocks (PRB) configured with the CSS.

As described above, in case the CSS is configured based on a unit of a subframe or a slot, a method for defining a group of PRBs, that is, one or more sub-bands, for configuring the CSS in the subframe or the slot is as follows.

The group of PRBs may be defined in a form of a function of i) each or ii) two or more of factors, such as, a physical cell ID (PCI) of a cell, a subframe or a slot index, a system bandwidth of the cell (number of PRBs), or a SCS value.

As another example, a base station may set whether to apply the factors or which of the factors is to be applied, and then transmit the result of the setting to a UE through cell-specific RRC signaling, such as a MIB or a SIB. Then the UE may configure one or more sub-bands for the CSS based on the signaling from the base station.

For example, the base station may cause the UE to set whether the UE will apply CSS sub-band hopping based on a unit of a subframe or a slot through the cell-specific RRC signaling, such as the MIB or the SIB.

The one or more CSS sub-bands defined based on a unit of each subframe or slot may be identical or be hopped depending on the corresponding subframe or slot index (indices).

A base station or network may directly configure frequency resource assignment information for configuring a CSS, and then transmit the configured information to a UE through cell-specific RRC signaling, such as a MIB or a SIB.

For example, the frequency resource assignment information for configuring the CSS may be transmitted being included in the MIB through a PBCH. At this time, the frequency resource assignment information may be bandwidth part assignment information for configuring the CSS or PRB assignment information in the corresponding bandwidth part.

Alternatively, a frequency resource for configuring the CSS may be limited to a frequency band through which a SS block is transmitted in a corresponding NR CC/cell. For example, the CSS may be configured through a bandwidth through which PSS/SSS or PBCH transmission is performed. Specifically, the CSS may be configured through a PRB identical to a PRB through which the PSS/SSS or PBCH transmission is performed. Or, the CSS may be configured through a bandwidth part including the PSS/SSS or the PBCH.

Embodiment 3 Transmission Numerology Configuration for a PDCCH

According to the Embodiment 3, a method may be provided for configuring a transmission numerology for a DL control channel including cell-specific DCI transmitted through a CSS or a CORESET configured with the CSS.

As described above, in case a plurality of numerologies is supported in an NR cell, each individual CSS may be configured for each numerology. In addition, it is possible to define only a CSS based on a reference numerology for PSS/SSS or PBCH transmission, that is, a single numerology.

Meanwhile, after having configured a transmission numerology of the CSS, a base station or network may transmit the result of the configuration to a UE through cell-specific RRC signaling, such as, a MIB or a SIB.

For example, configuration information related to the transmission numerology of the CSS (e.g. configuration information related to a length of a SCS or a cyclic prefix (CP), or the like) may be included in a MIB transmitted through a PBCH.

Additionally, in the NR, as a method of configuring a CSS for a UE, it is possible to define the CSS configuration to be performed with a plurality of CSSs classified per purpose/usage or a CORESET configured with the CSSs, Specifically, it is possible to define a separate CSS per purpose/usage, such as, i) a CSS for transmitting a PDCCH including scheduling control information for RMSI, ii) a CSS for transmitting a PDCCH including scheduling control information on other system information, that is, system information except for a MIB or a RMSI transmitted through a PBCH, iii) a CSS for transmitting scheduling control information on random access response (RAR), iv) a CSS for transmitting scheduling control information on a paging message, v) a CSS for a fallback operation for a UE-specific search space (USS) configured per UE, or vi) a CSS for transmitting multicast/broadcast control information, such as, a TPC command, or the like. It is noted that, one or more CSSs of the above CSSs may be shared for multiple specific purposes/usages, Thus, in case a plurality of CSSs is defined, each CSS configuration may be hierarchical. That is, each of the CSS configuration information discussed of the Embodiments 1, 2 and 3 described above may be performed sequentially through a MIB, a RMSI, or the like.

For example, CSS configuration related information for the RMSI may be transmitted through a MIB transmitted through a PBCH, and thereafter CSS configuration related information for other system information or CSS configuration related information for a paging, a RAR, or the like may be transmitted through the RMSI. The scope of the Embodiments discussed above may include all the cases in which a plurality of CSSs is defined according to purpose/usage and each CSS configuration is hierarchical.

Figure 5:
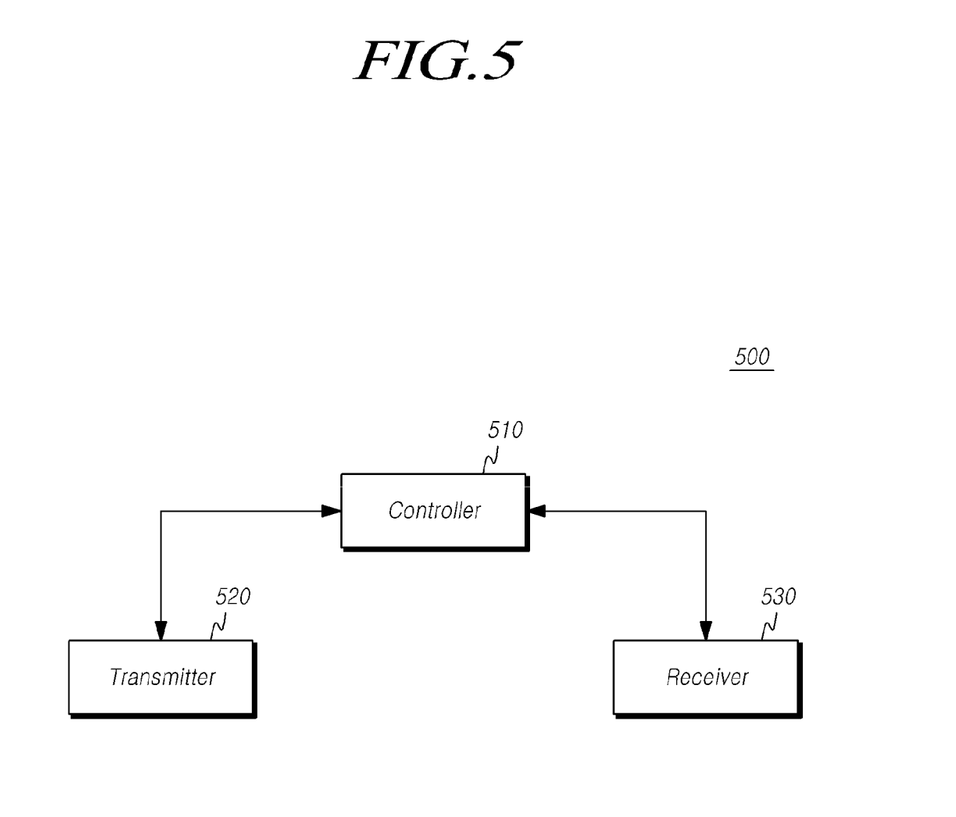
FIG. 5 is a block diagram illustrating a base station according to embodiments of the present disclosure.

FIG. 5 is a block diagram illustrating a base station according to embodiments of the present disclosure.

Referring to FIG. 5, the base station includes a controller 510, a transmitter 520, and a receiver 530.

The controller 510 is configured to control the overall operations of the base station 500 for transmitting a DL control channel in order to perform the embodiments described above.

Specifically, the controller may configure configuration information on a common search space (CSS).

An example of information included in such configuration information may be subcarrier spacing (SCS) information on a DL control channel transmitted to a UE through the common search space.

As described above, a plurality of numerologies may be configured in an NR cell, and numerologies used for transmitting a PDCCH may differ from one another. Accordingly, numerology configuration information on the PDCCH may be included in the configuration information on the common search space. As described above, the numerology may differ depending on a subcarrier spacing value. Therefore, subcarrier spacing information may be included in configuration information on the common search space.

Another example of information included in such configuration information may be time resource assignment information and frequency resource assignment information on the common search space.

At this time, the time resource assignment information may be information on a period of the common search space. The period may be defined as i) a fixed value regardless of a subcarrier spacing value or a slot length, or ii) a function of a subcarrier spacing value, or may be set by a subcarrier spacing value and a slot length used for transmitting a PSS/SSS or a PBCH.

At this time, a frequency resource assigned by the frequency resource assignment information may be assigned with one or more consecutive physical resource blocks (PRB). The frequency resource assignment information may include information on a group of consecutive PRBs configuring a common search space.

The transmitter 520 and the receiver 530 are configured to transmit and receive signals, messages, and data necessary for carrying out some embodiments as described above, to and from the UE respectively.

Specifically, the transmitter 520 is configured to transmit configuration information on the common search space to the UE and transmit a DL control channel (PDCCH) including information for scheduling remaining minimum system information (RMSI) through the common search space.

At this time, the configuration information on the common search space may be included in a master information block (MIB) transmitted through a physical broadcast channel (PBCH), and may be transmitted to the UE, as described above with reference to FIG. 4.

The base station may transmit the DL control channel through the common search space based on the configuration information on the common search space.

As described above, the DL control channel received through the common search space may include cell-specific DCI common to all UEs located in the cell. At this time, an example of information included in the cell-specific DCI may be information for scheduling remaining minimum system information (RMSI), that is, control information on the RMSI.

Figure 6:
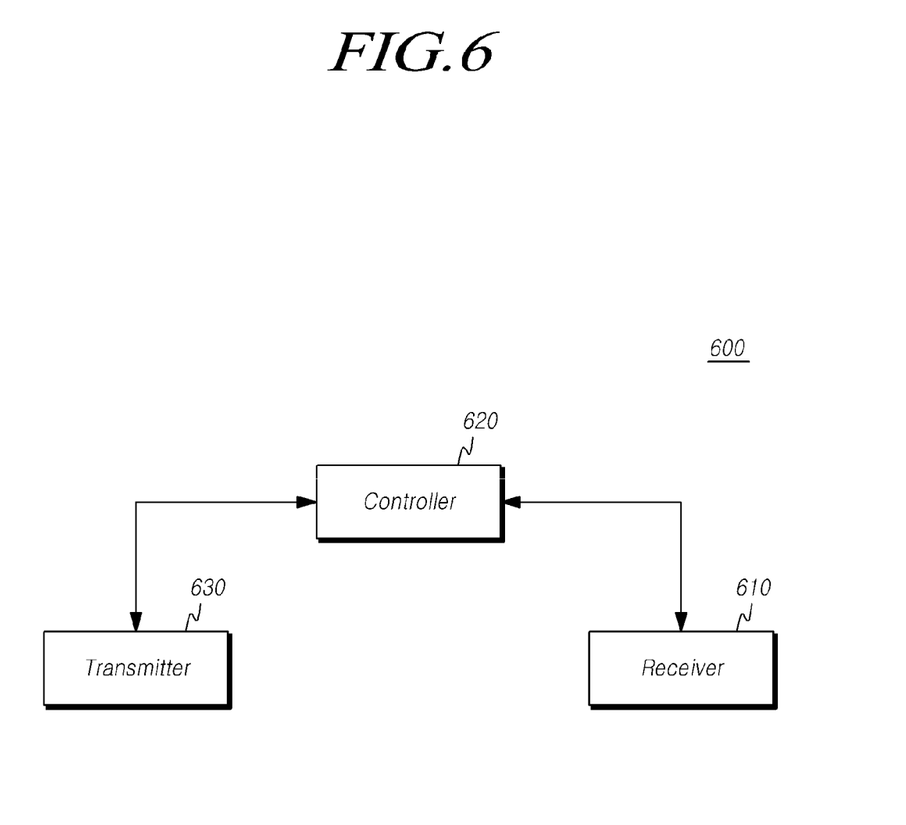
FIG. 6 is a block diagram illustrating a user equipment according to embodiments of the present disclosure.

FIG. 6 is a block diagram illustrating a UE according to embodiments of the present disclosure.

Referring to FIG. 6, the UE includes a receiver 610, a controller 620, and a transmitter 630.

The receiver 610 is configured to receive DL control information, data, and messages from a base station through a corresponding channel.

Specifically, the receiver 610 may be configured to receive configuration information on a common search space (CSS).

At this time, the configuration information on the common search space may be included in a master information block (MIB) received through a physical broadcast channel (PBCH). That is, when broadcasting the master information block to UEs located in the cell through the PBCH, the base station may include the configuration information on the common search space in the master information block.

An example of information included in such configuration information may be subcarrier spacing (SCS) information on a DL control channel transmitted to a UE through the common search space As described above, a plurality of numerologies may be configured in an RC cell, and a PDCCH may differ from one another. Accordingly, numerology configuration information on the PDCCH may be included in the configuration information on the common search space. As described above, the numerology may differ depending on a subcarrier spacing value. Therefore, subcarrier spacing information may be included in configuration information on common search space.

Another example of information included in such configuration information may be time resource assignment information and frequency resource assignment information on the common search space.

At this time, the time resource assignment information may be information on a period of the common search space. The period may be defined as i) a fixed value regardless of a subcarrier spacing value or a slot length, or ii) a function of a subcarrier spacing value, or may be set by a subcarrier spacing value and a slot length used for transmitting a PSS/SSS or a PBCH.

At this time, a frequency resource assigned by the frequency resource assignment information may be assigned with one or more consecutive physical resource blocks (PRB). The frequency resource assignment information may include information on a group of consecutive PRBs configuring a common search space.

The receiver 610 may be configured to receive a DL control channel (PDCCH) including information for scheduling remaining minimum system information (RMSI) through the common search space.

The DL control channel received through the common search space may include cell-specific DCI common to all UEs located in the cell. At this time, an example of information included in the cell-specific DCI may be information for scheduling remaining minimum system information (RMSI), that is, control information on the RMSI.

Controller is configured to control overall operations of the UE for receiving a DL control channel in order to perform the Embodiments described above.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

The invention claimed is:

1. A method of a user equipment for monitoring a downlink (DL) control channel, the method comprising:
   receiving, from a base station, configuration information for a common search space (CSS); and
   monitoring the DL control channel based on the configuration information for the CSS,
   wherein the DL control channel is for scheduling remaining minimum system information (RMSI),
   wherein the configuration information for the CSS is received in a master information block (MIB) through a physical broadcast channel (PBCH), and
   wherein the configuration information for the CSS in the MIB includes i) time resource allocation information and frequency resource allocation information, and ii) first subcarrier spacing (SCS) information and second SCS information,
   wherein a slot length of the first SCS information is four times greater than a slot length of the second SCS information.

2. The method according to claim 1, wherein the first SCS information is for a first bandwidth part, and the second SCS information is for the second bandwidth part.

3. The method according to claim 1, wherein the frequency resource allocation information relates to consecutive physical resource blocks (PRBs).

4. The method according to claim 1, wherein the first SCS information corresponds to 15 kHz, and the second SCS information corresponds to 60 kHz.

5. A method of a base station for transmitting a downlink (DL) control channel, the method comprising:
   configuring configuration information for a common search space (CSS);
   transmitting the configuration information to a user equipment; and
   transmitting the DL control channel based on the configuration information for the CSS,
   wherein the DL control channel is for scheduling remaining minimum system information (RMSI),
   wherein the configuration information for the CSS is transmitted in a master information block (MIB) through a physical broadcast channel (PBCH), and
   wherein the configuration information for the CSS in the MIB includes i) time resource allocation information and frequency resource allocation information, and ii) first subcarrier spacing (SCS) information and second SCS information,
   wherein a slot length of the first SCS information is four times greater than a slot length of the second SCS information.

6. The method according to claim 5, wherein the first SCS information is for a first bandwidth part, and the second SCS information is for the second bandwidth part.

7. The method according to claim 5, wherein the frequency resource allocation information relates to consecutive physical resource blocks (PRBs).

8. The method according to claim 5, wherein the first SCS information corresponds to 15 kHz, and the second SCS information corresponds to 60 kHz.

9. A user equipment for monitoring a downlink (DL) control channel comprising:
   a receiver configured to receive, from a base station, configuration information for a common search space, and monitor the DL control channel based on the configuration information for the CSS,
   wherein the DL control channel is for scheduling remaining minimum system information (RMSI),
   wherein the configuration information for the CSS is received in a master information block (MIB) through a physical broadcast channel (PBCH), and
   wherein the configuration information for the CSS in the MIB includes i) time resource allocation information and frequency resource allocation information, and ii) first subcarrier spacing (SCS) information and second SCS information,
   wherein a slot length of the first SCS information is four times greater than a slot length of the second SCS information.

10. The user equipment according to claim 9, wherein the first SCS information is for a first bandwidth part, and the second SCS information is for the second bandwidth part.

11. The user equipment according to claim 9, wherein the frequency resource allocation information relates to consecutive physical resource blocks (PRBs).

12. The user equipment according to claim 9, wherein the first SCS information corresponds to 15 kHz, and the second SCS information corresponds to 60 kHz.

* * * * *